United States Patent [19]

Rogers, Jr. et al.

[11] Patent Number: 4,753,751

[45] Date of Patent: Jun. 28, 1988

[54] POLYURETHANE COMPOSITION

[75] Inventors: Thomas H. Rogers, Jr., Akron; Michael E. Kimball, Norton, both of Ohio

[73] Assignee: The Goodyear Tire & Rubber Company, Akron, Ohio

[21] Appl. No.: 547,313

[22] Filed: Feb. 5, 1975

[51] Int. Cl.$^4$ .................. C08G 18/30; C08G 18/34; C09K 3/00; H05B 33/00
[52] U.S. Cl. .................. 252/182.17; 528/76; 528/80; 528/83
[58] Field of Search .......... 260/75 NH, 77.5 AM; 252/182, 188.3; 528/76, 80, 83

[56] References Cited

U.S. PATENT DOCUMENTS

| | | | |
|---|---|---|---|
| 3,036,996 | 5/1962 | Kogon | 260/77.5 AM |
| 3,194,793 | 7/1965 | Kogon | 260/75 NH |
| 3,456,037 | 7/1969 | Hoeschele | 260/75 NH |
| 3,905,944 | 9/1975 | Finelli | 260/75 NH |
| 3,926,919 | 12/1975 | Finelli | 260/75 NH |
| 3,940,371 | 2/1976 | Case | 260/77.5 AM |
| 3,942,672 | 3/1976 | Saracsan | 260/77.5 TB |

Primary Examiner—Harold D. Anderson
Assistant Examiner—Dennis R. Daley
Attorney, Agent, or Firm—J. D. Wolfe

[57] ABSTRACT

A polyurethane prepared with a curative comprising bis-2,2'-dithiodianiline plus a second amine selected from the class consisting of 4,4'-methylene dianiline, bis-4,4'-aniline disulfide, 1,5-diaminonaphthylene and m-phenylene diamine.

10 Claims, No Drawings

POLYURETHANE COMPOSITION

This invention relates to a new curative for polyurethane reaction mixtures. More specifically, this invention relates to a process for making polyurethanes having improved modulus at 500 percent elongation.

Recently bis-2,2'-dithiodianiline has been used commercially to cure polyurethane reaction mixtures as it gives a satisfactory pot life. Unfortunately, the product produced by this curative has a modulus at 500 percent elongation which does not compare favorably with those produced with methylene dichloroaniline.

Therefore, it is an object of this invention to provide a modified bis-2,2'-dithiodianiline curative which has satisfactory pot life and gives a polyurethane having improved modulus at 500 percent elongation.

The modified curative of this invention is produced by mixing bis-2,2'-dithiodianiline (bis-2) with a sufficient amount of a second diamine to give a homogeneous solution but never more than 60 percent by weight, the second diamine being selected from the Class consisting of 4,4'-methylene dianiline (MDA), bis-4,4'-aniline disulfide (bis-4), 1,5-diamino naphthylene (DAP) and m-phenylene diamine (M-PDA). If the amount of these second amines are kept below the amount that gives a nonhomogeneous mixture, viz. it is still soluble in bis-2,2'-dithiodianiline at 20° C., then the resulting curative has a pot life sufficient to permit castings to be readily made.

The modified curative of this invention comprises bis-2,2'-dithiodianiline plus 0.25 to saturation level of the above enumerated diamines of said Class. The preferred range is 0.25 to one percent of MDA and M-PDA, 0.25 to five percent of NAP and 0.25 to 60 percent of bis-4. The most preferred curative is a blend of bis-2,2'-dithiodianiline with about one to 60 percent of bis-4,4'-aniline disulfide as it gives a greater improvement in 500 percent modulus and good pot life for making castings of large sizes.

The curative of this invention can be used in either one-shot or prepolymer methods to form polyurethane. The curative is utilized to react with the excess isocyanate of the organic isocyanate or polyisocyanate relative to the reactive hydrogen-containing material. Other than the curative the reaction can be performed at the usual temperatures from below room temperature to above.

The nature of this invention can be more readily understood from the illustrative and representative example wherein all parts and percentages are by weight unless otherwise indicated.

EXAMPLE

A prepolymer was made by adding 10 parts of an alkylate phenolic antioxidant to a blend of 700 parts of a 2000 molecular weight and 300 parts of a 1000 molecular weight of polytetramethylene glycol and then reacting at 70° C. with 32.6 parts of di-3,3'-dimethyl-di-4,4'-diisocyantodiphenyl (also called TODI). Then this prepolymer was divided into 100 part aliquots. Each aliquot was mixed with 10 parts of an amine curative and cast into physical test sheets which were cured at 70° C. for 16 hours before being tested.

The physical test results on these samples are shown below for the amount of a specific curative used.

| Curative Blend Ingredient, % | | | Modulus 500% | Ultimate Tensile | Elongation | Compression Set, % |
|---|---|---|---|---|---|---|
| Bis-2 | DAP | Bis-4 | PSI | PSI | % | |
| 100 | 0 | 0 | 2960 | 6070 | 660 | 33 |
| 95 | 5 | 0 | 4300 | | | |
| 90 | 0 | 10 | 3880 | 7720 | 570 | 28 |
| 80 | 0 | 20 | 4160 | 7400 | 565 | 26 |
| 70 | 0 | 30 | 4310 | 7050 | 550 | 25 |
| 60 | 0 | 40 | 4850 | 7400 | 530 | 26 |
| 50 | 0 | 50 | 6300 | 7520 | 525 | 21 |
| 40 | 0 | 60 | 6400 | 7220 | 575 | 25 |

The data in the above table shows the blend of bis-2 with the second diamine appreciably improves the physicals of the cured polyurethanes.

In the above example the curatives are shown with a representative reactive hydrogen containing compound of the range of 500 to 6500 molecular weight. It should be indicated that instead of the polytetramethylene glycols, any of the other polyether polyols of 2 to 8 hydroxyls could be used. For example, polypropylene ether glycol could be used in the above example to obtain the benefit of these Class A curatives. Likewise, the polyester polyols obtained by reacting a polyol of 2 to 3 hydroxyls and 2 to 20 carbon atoms with a polycarboxylic acid of 2 to 20 carbon atoms could be used equally well in the above example to obtain benefit with this Class of curatives. To be more specific, polyesters such as polyethylene adipate, polytetramethylene azelate or the aromatic polyester can be used instead of polytetramethylene glycol.

The examples utilized TODI to make the prepolymer but any of the organic polyisocyanates can be used. Representative examples of these useful organic polyisocyanates are toluene diisocyanate, methylene (diphenyl isocyanate) sometimes called MDI and hydrogenated MDI. Generally, the reactive hydrogen material and organic polyisocyanate can be used in any ratio but the ratio of 1.1 to 3.5 is preferred.

The curatives of this invention comprise bis-2,2'-dithiodianiline containing a second diamine in the amount of 0.25 percent to no more than 60 percent by weight but less than the amount that exceeds said second diamine's solubility in bis-2,2'-dithiodianiline at 20° C. A preferred range for bis-4 is 10 to 60 percent by weight.

While certain representative embodiments and details have been shown for the purpose of illustrating the invention, it will be apparent to those skilled in the art that various changes and modifications may be made therein without departing from the spirit or scope of the invention.

What is claimed is:

1. A curative for polyurethane reaction mixtures comprising a reactive hydrogen containing compound selected from the class of polyethers and polyesters and an excess of di-3,3'-dimethyl-di-4,4'-diisocyantodiphenyl, said curative comprising bis-2,2'-dithiodianiline plus a second amine selected from the class consisting of 4,4'-methylene dianiline, bis-4,4'-aniline disulfide, 1,5-diaminonaphthylene and m-phenylene diamine, said second amine being present in 0.25 percent to no more than 60 percent by weight, but less than the amount that exceeds its solubility in bis-2,2'-dithiodianiline at 20° C.

2. The curative of claim 1 wherein the second amine is bis-4,4'-aniline disulfide.

3. The curative of claim 2 wherein the second diamine is present in 10 to 60 percent by weight.

4. The curative of claim 1 wherein the second diamine is 1,5-diaminonaphythylene.

5. A curative comprising a blend consisting of (a) a diamino diaryl disulfide and (b) an aromatic diamine.

6. A curative comprising a blend consisting of (a) diamino diphenyl disulfides with amino groups located in different phenyl radicals and having the amino groups located ortho to the disulfide group, and (b) an aromatic diamine.

7. A curative comprising a blend consisting of (a) from 25 to 99 percent by weight of a diamino diaryl disulfide and (b) from 1 to 75 percent by weight of an aromatic diamine, based on the sum of the weights of (a) plus (b).

8. A curative comprising a blend consisting of (a) 2,2'-diaminodiphenyl disulfide and (b) an aromatic diamine.

9. A curative comprising a blend consisting of (a) 2,2'-diaminodiphenyl disulfide and (b) an aromatic diamine selected from M-phenylene diamine and methylene bis(aniline).

10. The curative composition of claim 9 in which the amount of said 2,2'-diaminodiphenyl disulfide varies from 40 to 99.75 percent by weight and the amount of said aromatic diamine varies from 0.25 to 60 percent by weight of the sum of the weights of said 2,2'-diaminodiphenyl disulfide plus said aromatic diamine.

* * * * *